United States Patent
Longenecker et al.

(10) Patent No.: US 12,496,878 B2
(45) Date of Patent: Dec. 16, 2025

(54) AIR CONDITIONING SYSTEM AND METHOD FOR OPERATION AT A RECREATION VEHICLE

(71) Applicant: Haier US Appliance Solutions, Inc., Wilmington, DE (US)

(72) Inventors: Joshua Duane Longenecker, Louisville, KY (US); Richard Dustin Henderson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 429 days.

(21) Appl. No.: 17/824,580

(22) Filed: May 25, 2022

(65) Prior Publication Data
US 2023/0382194 A1     Nov. 30, 2023

(51) Int. Cl.
*B60H 1/32*    (2006.01)
*B60H 1/00*    (2006.01)

(52) U.S. Cl.
CPC ....... *B60H 1/3205* (2013.01); *B60H 1/00364* (2013.01); *B60H 1/3226* (2013.01); *B60H 2001/3272* (2013.01); *B60H 2001/3292* (2013.01)

(58) Field of Classification Search
CPC .............. B60H 1/3205; B60H 1/00364; B60H 1/3226; B60H 2001/3272; B60H 2001/3292; B60H 1/00428
See application file for complete search history.

(56) References Cited

U.S. PATENT DOCUMENTS

| | | | |
|---|---|---|---|
| 4,617,472 A * | 10/1986 | Slavik | H02J 3/14 307/130 |
| 6,840,055 B2 | 1/2005 | Iritani | |
| 7,739,882 B2 | 6/2010 | Evans et al. | |
| 7,946,123 B2 | 5/2011 | Tolbert et al. | |
| 10,974,570 B2 | 4/2021 | Chevers et al. | |
| 11,967,857 B1 * | 4/2024 | Cooper | H02J 9/00 |
| 2021/0070135 A1 * | 3/2021 | Andrade Dias | H02J 7/0024 |
| 2023/0098535 A1 * | 3/2023 | Scalf | B60H 1/00428 62/203 |

FOREIGN PATENT DOCUMENTS

WO     WO-2012091376 A2 *    7/2012    ............... B60L 1/02

OTHER PUBLICATIONS

Machine Translated WO-2012091376-A2 (Year: 2019).*

* cited by examiner

*Primary Examiner* — Anne Marie Antonucci
*Assistant Examiner* — Misa H Nguyen
(74) *Attorney, Agent, or Firm* — Dority & Manning, P.A.

(57) ABSTRACT

An air conditioning system and method for operation at a recreation vehicle is provided. The air conditioning system includes an inverter operably coupled to a motor. The inverter is configured to provide power to the motor in a first operating mode or a second operating mode. The motor is operably coupled to a compressor. A controller is in operable communication with the air conditioning system. The controller is configured to obtain a power limit signal; receive a control command corresponding to providing power to the air conditioning device; and determine, based on a power limit, whether to receive power at the air conditioning device in the first operating mode or the second operating mode.

11 Claims, 8 Drawing Sheets

AIR CONDITIONING SYSTEM AND METHOD FOR OPERATION AT A RECREATION VEHICLE

FIELD OF THE INVENTION

The present subject matter relates generally to air conditioning systems, and more particularly, to recreation vehicle air conditioning systems and methods for operating the air conditioning system at a recreation vehicle.

BACKGROUND OF THE INVENTION

Certain recreation vehicles include an air conditioning system, referred to generally as a recreation vehicle air conditioner (RVAC), for maintaining a comfortable temperature within the passenger compartment. The air conditioning units are typically mounted on the roof or another exterior location of the recreation vehicle and utilize a sealed system for circulation refrigerant between an indoor and outdoor heat exchanger to facilitate heat transfer.

RVAC units are generally fixedly configured to operate at limited capacity based on the limited power capacity from generators, batteries, or low capacity circuits. High variability of power inputs to RVAC compressors generally require under-sizing the compressor to avoid tripping a circuit breaker.

Power draw from other appliances at the recreation vehicle may further exasperate such issues by drawing power from the limited low capacity circuits and power supplies. Still further, operation of such appliances while operating the RVAC under such conditions may trip the circuit breaker.

Accordingly, an improved air conditioner unit would be useful. More specifically, air conditioning systems and methods for operation at a recreation vehicle that can mitigate or eliminate circuit overloading would be beneficial.

BRIEF DESCRIPTION OF THE INVENTION

Aspects and advantages of the invention will be set forth in part in the following description, or may be apparent from the description, or may be learned through practice of the invention.

In accordance with one exemplary embodiment of the present disclosure, an air conditioning system is provided. The air conditioning system includes an inverter operably coupled to a motor. The inverter is configured to provide power to the motor in a first operating mode or a second operating mode. The motor is operably coupled to a compressor. A controller is in operable communication with the air conditioning system. The controller is configured to obtain a power limit signal; receive a control command corresponding to providing power to the air conditioning device; and determine, based on a power limit, whether to receive power at the air conditioning device in the first operating mode or the second operating mode.

Another aspect of the present disclosure is directed to a method for operating an air conditioning device at a recreation vehicle. The method includes obtaining a power limit signal; receiving a control command corresponding to providing power to the air conditioning device; and determining, based on a power limit, whether to receive power at the air conditioning device in the first operating mode or the second operating mode.

Still another aspect of the present disclosure is directed to a computer-readable medium configured to store instructions that, when executed by a computing device, cause the computing device to perform operations. The operations include obtaining a power limit signal; receiving a control command corresponding to providing power to an air conditioning device; and determining, based on a power limit, whether to receive power at the conditioning device in the first operating mode or the second operating mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
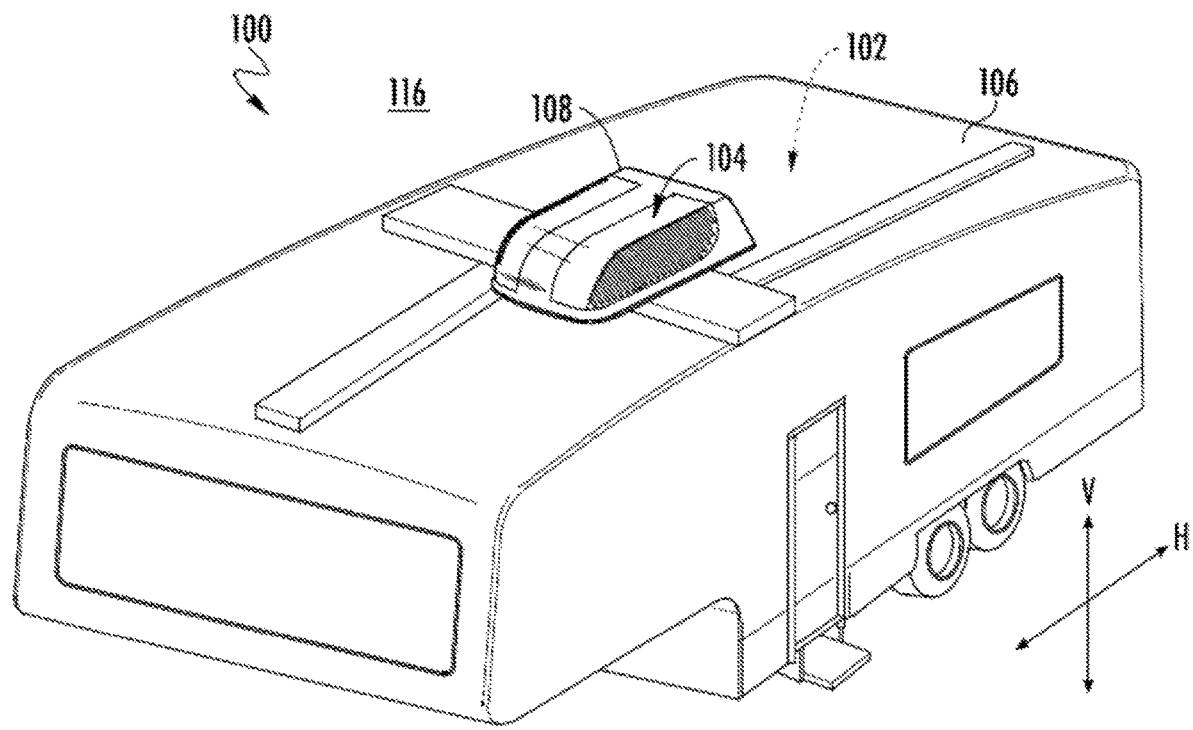
FIG. 1 provides a perspective view of a recreation vehicle according to an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error.

FIG. 1 provides a perspective view of an exemplary recreation vehicle 100 in accordance with the present disclosure. People may employ recreation vehicle 100 for a variety of purposes, including transportation, cooking, eating, sleeping, entertaining, and the like. As such, recreation vehicle 100 defines a passenger compartment 102, which may further include a bed, stove, table, restroom, or multiple compartments for storing items that passengers wish to take with them on their travels. Because people often spend significant time within the passenger compartment of recreation vehicle 100, climate control of the passenger compartment is desirable.

Accordingly, an air conditioning system 104 may be mounted on recreation vehicle 100 to provide cooled air to the passenger compartment. Air conditioning system 104 is typically mounted to an outside surface 106 of recreation vehicle 100. This arrangement is desirable because a byproduct of operation of air conditioning system 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioning system 104 may be mounted on an outer surface 106, such as the ceiling or top of recreation vehicle 100. Also as shown in FIG. 1, air conditioning system 104 may include a top cover or outer grill 108 that is positioned over the working components air conditioning system 104, e.g., to protect such working components from rain, wind, debris, etc.

Figure 2:
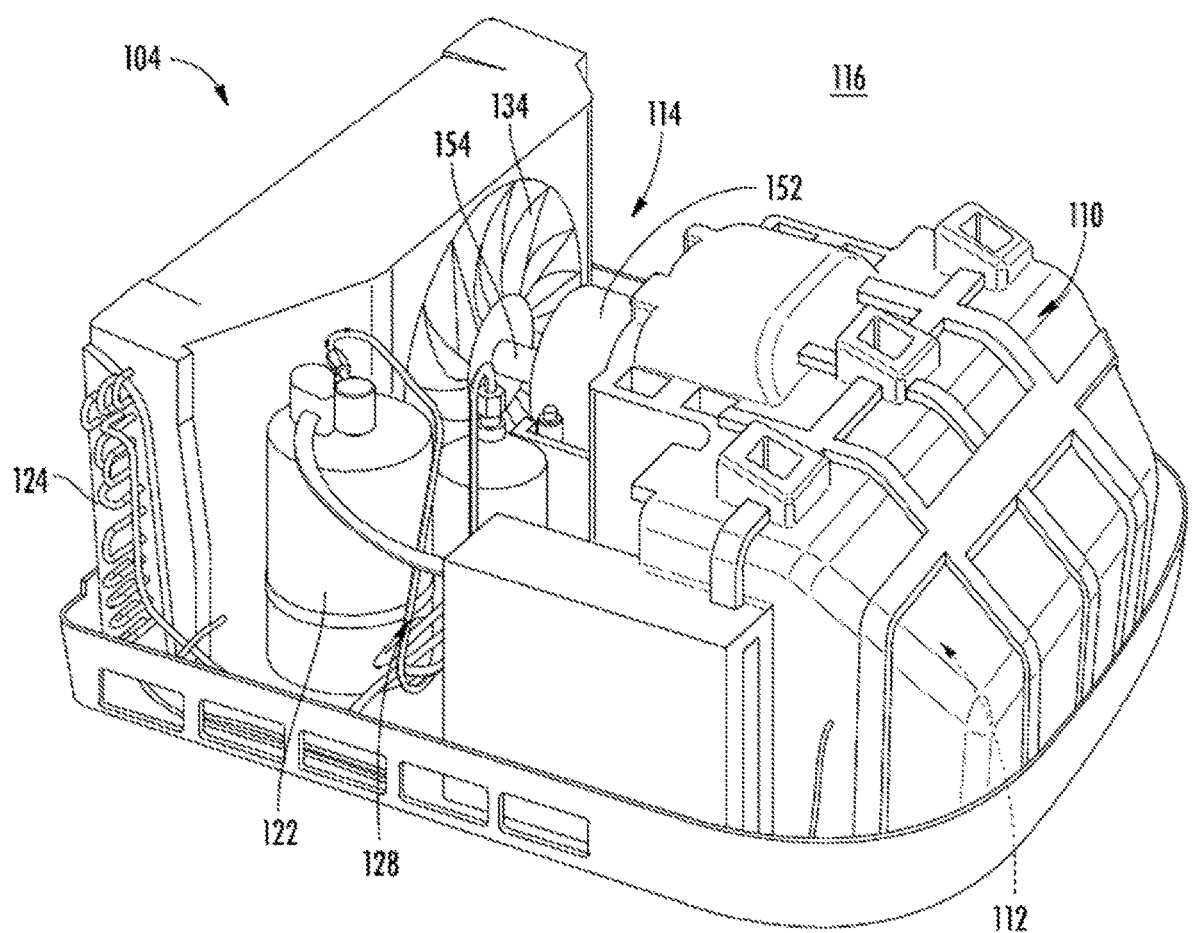
FIG. 2 provides a perspective view of a recreation vehicle air conditioner (RVAC) that may be used with the exemplary recreation vehicle of FIG. 1, with an outdoor cover removed for clarity.
Figure 3:
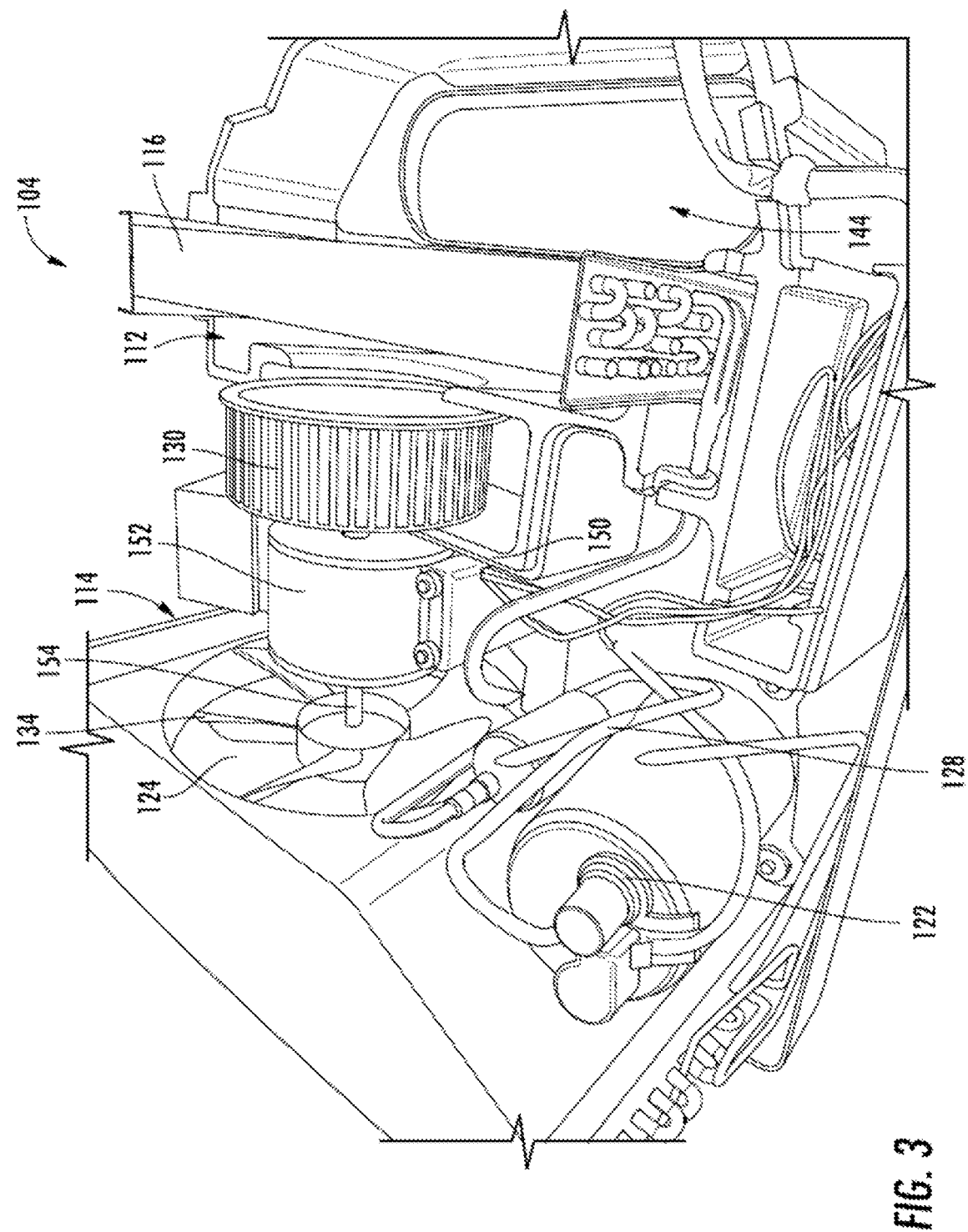
FIG. 3 provides a perspective view of the exemplary RVAC of FIG. 2 with an indoor cover removed for clarity.
Figure 4:
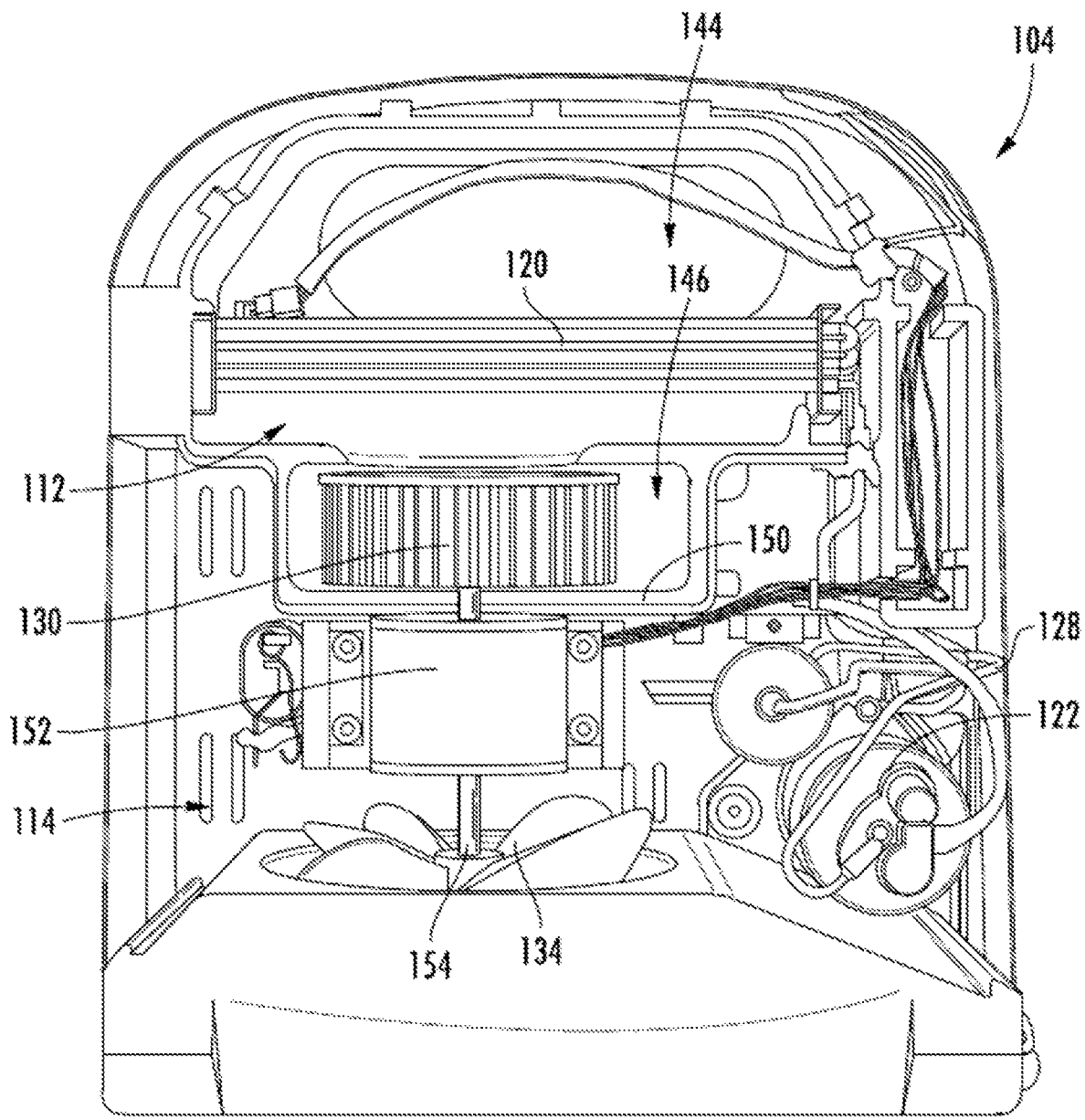
FIG. 4 provides a top view of the exemplary RVAC of FIG. 2 with an indoor cover removed for clarity.
Figure 5:
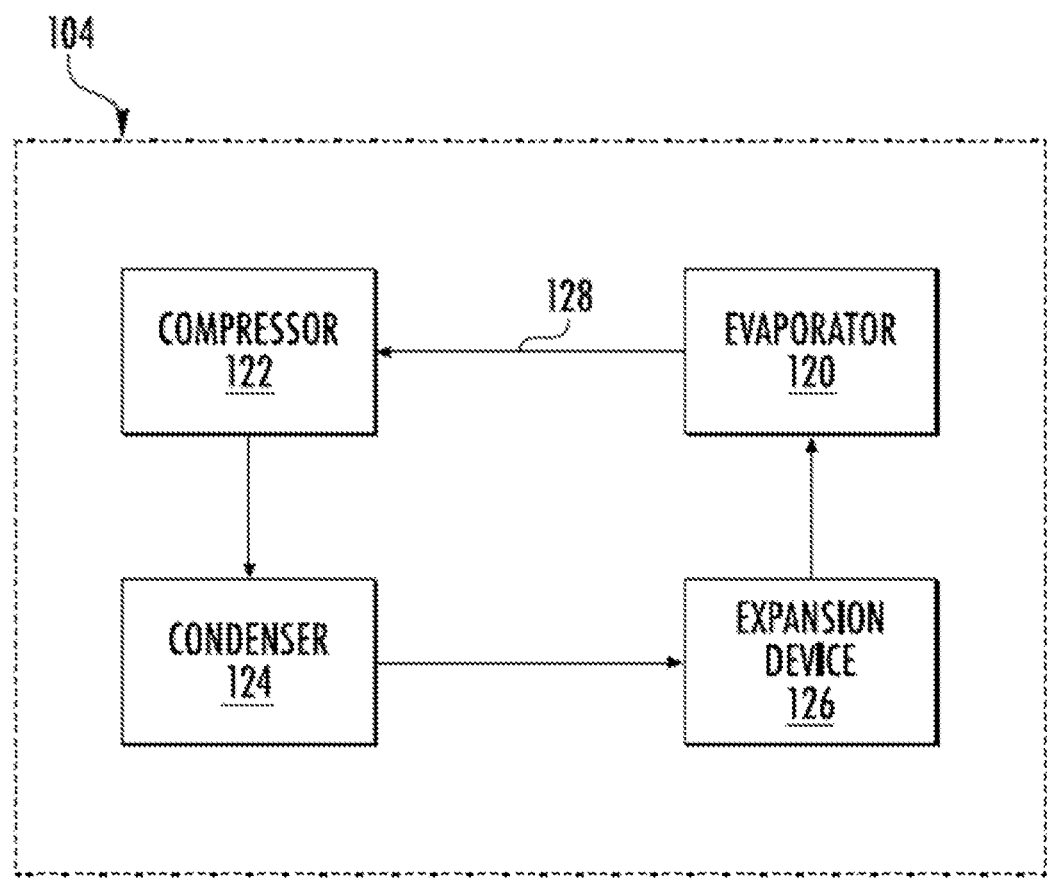
FIG. 5 provides a schematic view of an air conditioning system according to an exemplary embodiment of the present disclosure.
Figure 6:
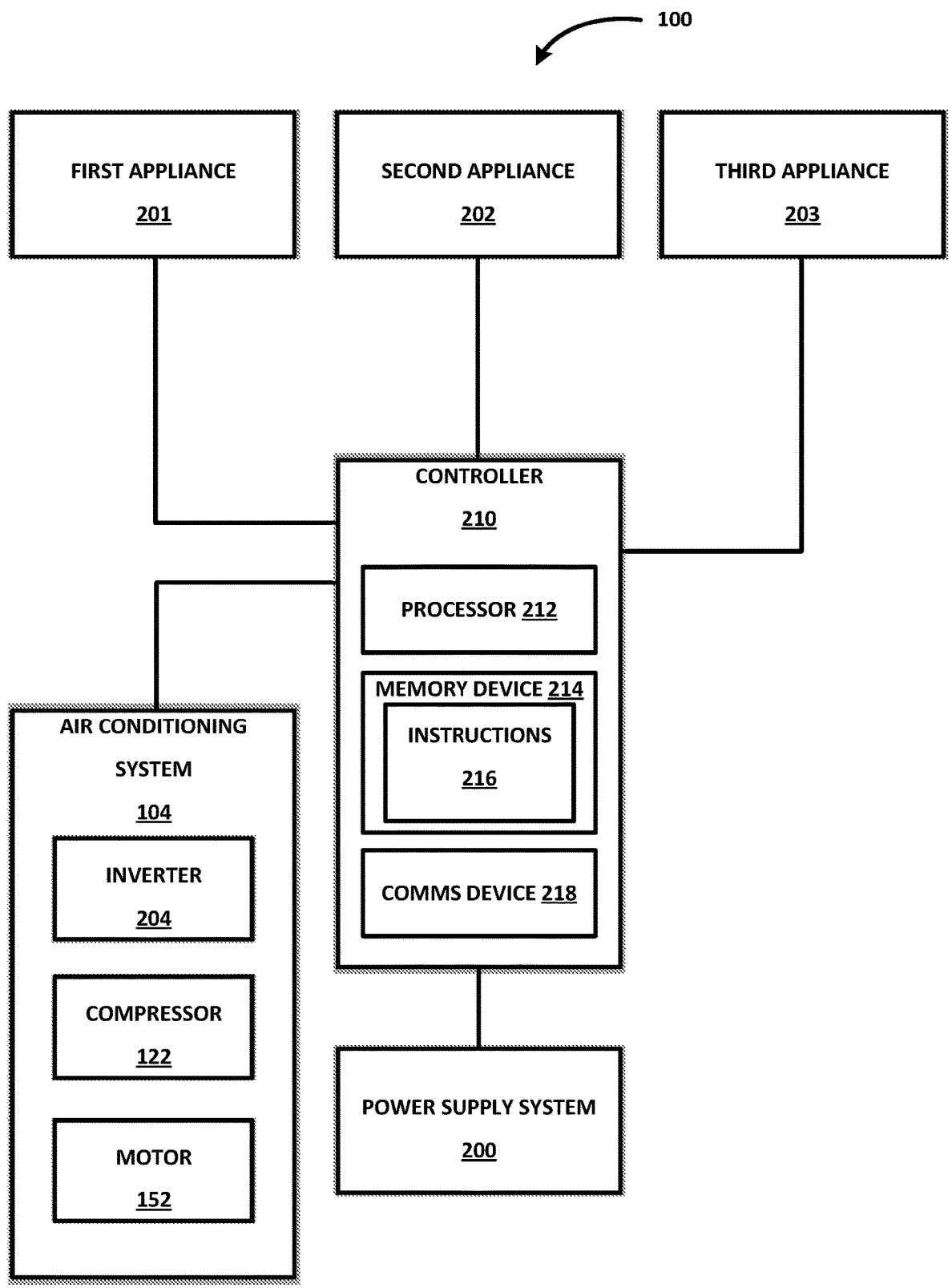
FIG. 6 provides a schematic view of a recreation vehicle according to an exemplary embodiment of the present disclosure.

Referring now generally to FIGS. 2 through 6, the operation of air conditioning system 104 will be described in more detail according to exemplary embodiments of the present subject matter. As illustrated, outer grill 108 has been removed to reveal working components of air conditioning system 104. Air conditioning system 104 generally includes an indoor bulkhead for indoor cover 110 that divides air conditioning system 104 between an indoor and outdoor portion, such as in a packaged terminal air conditioner unit (PTAC) or a split heat pump system. Specifically, indoor cover 110 defines and indoor air plenum 112 and an outdoor air plenum 114. In this regard, as shown in FIGS. 2 and 6, indoor cover 110 generally shields the indoor components of air conditioning system 104 from the outdoor environment 116. As shown in FIGS. 3 and 4, indoor cover 110 is removed to reveal additional working components of air conditioning system 104, each of which will be described below in detail.

Referring now generally to FIGS. 2 through 6, relevant components of air conditioning system 104 will be described. It will be understood that air conditioning system 104 includes various heat pump components, such as a sealed system, for treating air within an interior of an associated recreation vehicle 100. Such components are well understood by those skilled in the art and a description of such components is omitted for the sake of brevity. In this regard, for example, air conditioning system 104 includes refrigerant circulating between evaporator 120, compressor 122, condenser 124, and expansion device 126, as shown in the refrigeration loop 128 of air conditioning system 104 in FIG. 2. Refrigerant, also known as coolant, carries heat from the passenger compartment 102 of recreation vehicle 100 to the outdoors 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized.

The refrigerant begins by passing through evaporator 120 in liquid form. Ambient air or air from the passenger compartment 102 may pass over evaporator 120, e.g., as motivated by an evaporator air handler. More specifically, as illustrated, air conditioner system 104 may include an indoor fan 130 configured for urging a flow of indoor air. Because the liquid refrigerant is cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well-above the ambient temperature outside of recreation vehicle 100. From compressor 122, the heated refrigerant is delivered to condenser 124. Air may pass over condenser 124, e.g., as motivated from a condenser air handler. More specifically, as illustrated, air conditioning system 104 may include an outdoor fan 134 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process.

In order to transport cooled air from the air conditioning system 104 on an outside surface 106 of recreation vehicle 100 to the passenger compartment 102 on the inside of recreation vehicle 100, outer surface 106 may define an opening 140 that is in fluid communication with indoor air plenum 112. In addition, air conditioning system 104 may include a ceiling-mount cover panel 142 that may be mounted on a ceiling within an interior of an associated recreation vehicle. Cover panel 142 may overlay and hide components of air conditioning system 104 to provide a pleasant cosmetic appearance for air conditioning system 104. Cover panel 142 may also include perforated sections to allow the flow of outdoor air 132 through cover panel 142.

For example, cover panel 142 may include an air inlet 144 and an air outlet 146. Air inlet and outlets 144, 146 may be separate from each other on cover panel 142. Air from within the interior of the associated recreation vehicle may flow through cover panel 142 via air inlet 144, and such air may be treated (e.g., heated or cooled) by a sealed system of air conditioning system 104, and the treated air may then flow back into the interior of the associated recreation vehicle through cover panel 142 via air outlet 146. Cover panel 142 may also include a removable filter cover (not shown) mounted to cover panel 142 and being perforated to allow air flow through the filter cover. For example, the filter cover may support or hold a filter medium, such as a concertinaed or pleated fabric filter, fiberglass filter, etc., that filters air entering air conditioning system 104 at air inlet 144.

As shown, indoor fan 130 is positioned within indoor air plenum 112, e.g., adjacent a vertical bulkhead 150 which is part of indoor cover 110. According to the illustrated embodiment, a fan drive motor 152 is positioned outside of indoor air plenum 112, e.g., within outdoor air plenum 114. This may be advantageous, for example, to cool drive motor 152 by permitting the flow of outdoor air 136 to pass over drive motor 152, to reduce noise within passenger compartment 102, or for a variety of other reasons. Notably, however, mounting drive motor 152 outside of indoor air plenum 112 requires a drive shaft 154 to pass through indoor cover 110 in order to mechanically coupled with indoor fan 130.

In certain embodiments, indoor cover 110 may form a shaft aperture through which drive shaft 154 may pass from outdoor air plenum 114 into indoor air plenum 112. Specifically, drive shaft 154 mechanically couples drive motor 152 positioned in outdoor air plenum 114 with indoor fan 130 positioned within indoor air plenum 112.

Referring now to FIG. 6, a schematic diagram of devices at a recreation vehicle 100 is provided. The recreation vehicle 100 includes a plurality of appliances, such as schematically depicted as first appliance 201, second appliance 202, and third appliance 203. It should be understood that while a first, second, and third appliance is schematically depicted, the recreation vehicle 100 can include any quantity of appliances (e.g., a fourth appliance, a fifth appliance, . . . an Nth appliance). Various embodiments of the appliances may include a cooking device (e.g., an electric cooktop device), a refrigeration device (e.g., a refrigerator or freezer appliance), a laundry device (e.g., a washer appliance or dryer appliance), a dishwasher appliance, an auxiliary device (e.g., any other device that may be plugged into a power outlet, such as, but not limited to, an audio player device, a visual media device, a television, a computing device, a rechargeable device, a space heater, etc.), or combinations thereof. The recreation vehicle 100 may generally a power supply device 200, such as, but not limited to, a generator, a motor-generator, a battery or capacitor device, an external power supply (e.g., from a campsite, residential building, commercial building, or other power source), or other appropriate engine or electric machine configured to generate and output electric power.

Particular embodiments of the recreation vehicle 100 include the air conditioning system 104 including the compressor 122 and motor 152 configured as a variable speed compressor. The air conditioning system 104 configured with a variable speed or variable speed drive compressor may be configured as a variable frequency drive compressor. In an embodiment, motor 152 and inverter 204 are configured to convert input alternating current (AC) power to direct current (DC) power and/or AC power. Inverter 204 may include any appropriate power electronics device. Inverter 204, motor 152, and compressor 122 are operably coupled together to allow for variable speed operation of compressor 122. It should be appreciated that one or more components described herein may be integrated as a single unit. For instance, compressor 122 and motor 152 may be integrated as a single compressor assembly.

In various embodiments further described herein, controller 210 is communicatively coupled to the air conditioning system 104 and the plurality of appliances 201, 202, 203. Controller 210 includes a processor 212, a memory device 214, and a communications device 216. The memory device 214 is configured to receive and store instructions 216, such as one or more steps of a method for operating the air conditioning system 104 and plurality of appliances 201, 202, 203. The communications module 218 provides a wired or wireless bus to send and/or receive signals at the air conditioning system 104 and plurality of appliances 201, 202, 203, including commands based on the instructions 218.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device may generally include memory element(s) including, but not limited to, computer readable medium (e.g., random access memory (RAM)), computer readable non-volatile medium (e.g., flash memory), or other suitable memory elements or combinations thereof.

In general, communication between controller 210, air conditioning system 104, appliances 201, 202, 203, and/or other user devices may be carried using any type of wired or wireless connection and using any suitable type of communication network, non-limiting examples of which are provided below. For example, an external device, such as a smartphone, tablet device, laptop computer, or other computing device may be in direct or indirect communication with controller 210 through any suitable wired or wireless communication connections, interfaces, or networks. Communications configurations may include a serial communication protocol. For example, networks and protocols may include one or more of a controller area network (CAN bus), a local area network (LAN), a wide area network (WAN), a personal area network (PAN), the Internet, a cellular network, any other suitable short- or long-range wireless networks, etc. In addition, communications may be transmitted using any suitable communications devices or protocols, such as via serial communication, Wi-Fi®, Bluetooth®, Zigbee®, wireless radio, laser, infrared, ethernet communication or Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL). Particular portions of controller 210, such as the communications device 218, may be in operable communication with a network, such as to receive or provide instructions, commands, etc.

Embodiments of the recreation vehicle 100 include inverter 204 configured to monitor power limits via an electronic switch between a first operating mode and a second operating mode. The first operating mode may correspond to a first amp circuit and the second operating mode may correspond to a second amp circuit. In a particular embodiment, the first amp circuit is less than the second amp circuit. In various embodiments, circuit may be configured to have 50 amp output, 30 amp output, 20 amp output, or 15 amp output. Still various power supply devices may output approximately 110 volts to approximately 120 volts or approximately 220 volts to approximately 240 volts. Controller 210 may include a power limit selector. In a particular embodiment, controller 210 includes, or is communicatively coupled to, a thermostat operably coupled to the air conditioning system 104. Controller 210 is further operably coupled to the plurality of appliances 201, 202, 203.

Figure 7:
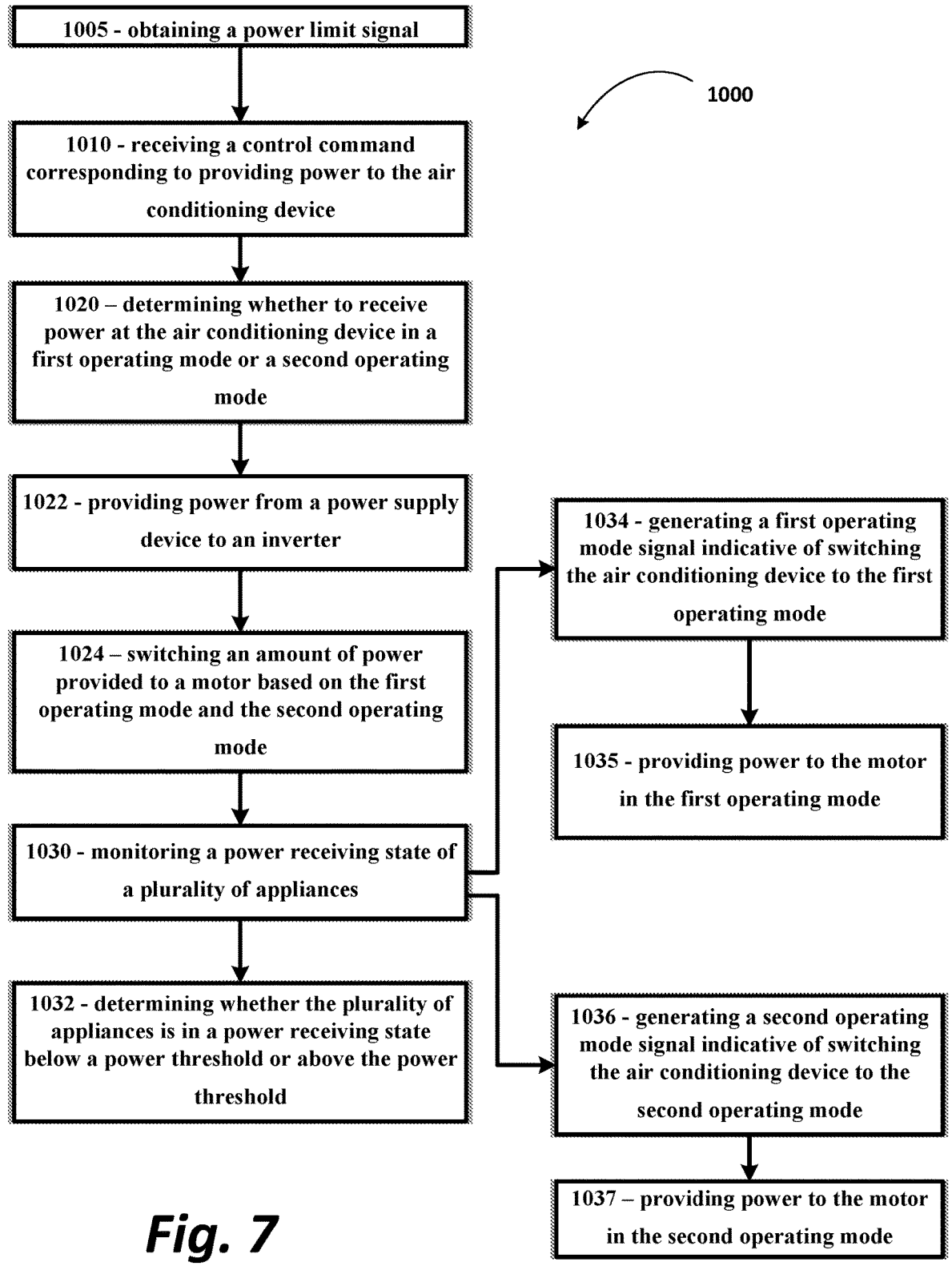
FIG. 7 provides a flowchart outlining steps of an exemplary method for operating an air conditioning device at a recreation vehicle.

Referring to FIG. 7, a flowchart outlining steps of a method for controlling an air conditioning system and a plurality of appliances is provided (hereinafter, "method 1000"). Method 1000 includes one or more steps that may be transmitted to or stored as steps or operations at instructions 216, or form input or output signals to or from controller 210, or received to or from air conditioning system 104 and appliances 201, 202, 203. Although particular embodiments of the recreation vehicle 100 and the air conditioning system 104 are depicted and described in FIGS. 1-5, it should be appreciated that method 1000 may be applied to any recreation vehicle, air conditioning system, appliances, or combinations thereof. Particular embodiments of the air conditioning system may generally include a heating, air conditioning, and ventilation (HVAC) system. Accordingly, "air conditioning" may include systems configured to provide cooled or heated air or flowing ambient air.

Method 1000 includes at 1005 obtaining a power limit signal. Obtaining, receiving, or otherwise acquiring the power limit signal may include manual, electronic, or automatic selection of a power limit (e.g., a dip switch or other appropriate mechanical or electronic switch). Power selection may identify a type of power applied to the system (e.g., 15 A, 20 A, etc.). Power selection may further communicate total power or current limit applied to the system. The power limit signal generally corresponds to a power output provided by the power supply device. As provided above, in various instances, the power supply device is configured to output various voltage and current levels. The power limit signal is indicative of the current or voltage received at the recreation vehicle. In a particular embodiment, controller 210, inverter 204, or power supply device 200 is configured with a power line monitor configured to determine an output voltage or current. In various embodiments, the controller 210 or power supply device 200 is configured to generate and transmit the power limit signal to inverter 204. In certain embodiments, a user may provide a control input or switch corresponding to the power limit and power limit signal described above. In various embodiments, method 1000 at 1005 may include transmitting a power limit signal and receiving the power limit signal at the inverter. As used herein, "power" may refer generally to a function of voltage and current, and associated methods and devices for adjusting, modulating, or otherwise controlling one or both of voltage or current, or particularly to adjusting, modulating, or otherwise controlling current.

Method 1000 includes at 1010 receiving a control command corresponding to providing power to the air conditioning device (e.g., air conditioning system 104). The control command may generally correspond to a signal commanding or requesting power to be provided to the air conditioning device. For instance, the control command may include a thermostat setting, a command for cooling or heating operation, a command for fan operation (e.g., blowing ambient or outside air), or other appropriate function of the air conditioning device. Method 1000 includes at 1020 determining, based on a power limit, whether to receive power at the air conditioning device in a first operating mode or a second operating mode. The power limit corresponds to a threshold at or above which a circuit breaker may be tripped, such as due to circuit overload or other excessive loading conditions at the circuit. The first operating mode corresponds to providing power to the air conditioning device at a lower power setting in contrast to a second operating mode. The lower power setting may particularly correspond to a lower amperage or voltage than the second operating mode at a higher power setting. In a particular embodiment, determining whether to receive power at the air conditioning device in the first operating mode or the second operating mode includes at 1022 providing power from a power supply device (e.g., power supply device 200) to an inverter (e.g., inverter 204) and at 1024 switching, via the inverter, an amount or magnitude of power provided to a motor based on the first operating mode and the second operating mode. In certain embodiments, the method 1000 at 1022 includes commanding power draw from a power supply device. In a particular embodiment, the method 1000 at 1024 includes switching, via the inverter, an amount or magnitude of power provided to a motor configured to drive a variable speed compressor (e.g., motor 152 operably coupled to drive compressor 122) based on the first operating mode and the second operating mode.

In various embodiments, method 1000 includes at 1030 monitoring a power receiving state of a plurality of appliances (e.g., appliances 201, 202, 203). Method 1000 may further include at 1040 switching between the first operating mode and the second operating mode based on the power receiving state of the plurality of appliances.

The power receiving state may generally include a signal indicative of or corresponding to whether the plurality of appliances is drawing power from the power supply device at or above a power threshold. For instance, the plurality of appliances may draw a nominal amount of power from the power supply device, such as by being plugged into a power outlet at the recreation vehicle. Such nominal amount of power may correspond to operating timing devices, memory devices, sleep mode, neutral position, or other low power activity. In contrast, the power receiving state corresponds to a high power activity at the plurality of appliances. High power activity may include, but is not limited to, operating cleaning cycles at a cleaning appliance (e.g., operating motors, compressors, pumps, rotors, heating elements, flow devices, etc.), generating heat or otherwise performing a cooking function at cooking appliances (e.g., cooktop devices, microwaves, air fryers, induction heaters, etc.), generating heat, flowing air, or operating a motor at a dryer appliance, or operating a compressor, pump, heat exchanger, or other device to remove heat at a refrigeration or freezer appliance. It should be appreciated that the power receiving state, or a signal corresponding thereto, may include a sum or collective signal based on the plurality of appliances in any combination of low power activity or high power activity. Still further, the power receiving state may include a magnitude or amount of power draw from a plug at an auxiliary device.

Referring briefly to FIGS. 8A-8B and FIGS. 9A-9B, graphs 700, 800 depict exemplary operating modes based on embodiments of method 1000. In various embodiments, method 1000 includes at 1032 determining whether the plurality of appliances is in a power receiving state below a power threshold or above the power threshold. The power threshold may generally refer to a limit at which the air conditioning device may function in the first operating mode or the second operating mode. When the power receiving state is below the power threshold, such as depicted in FIG.

Figure 8A:
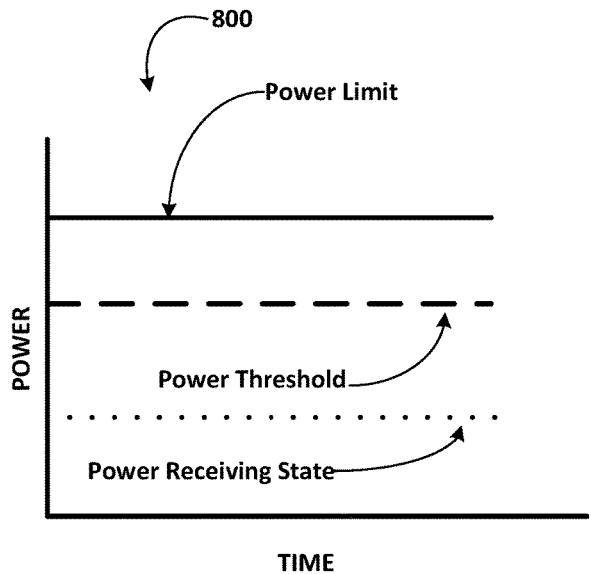
FIG. 8A provides a graph depicting an embodiment of a first operating mode in accordance with the method outlined in FIG. 7.
Figure 8B:
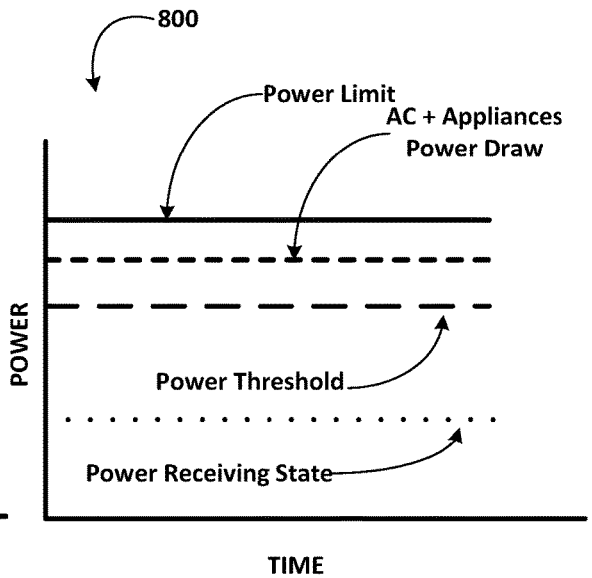
FIG. 8B provides a graph depicting an embodiment of a first operating mode in accordance with the method outlined in FIG. 7.

8A, method 1000 includes at 1034 generating a first operating mode signal indicative of switching the air conditioning device to the first operating mode. In a particular embodiment, the method 1000 includes at 1035 providing, via the inverter, power to the motor in the first operating mode. In still particular embodiments, method 1000 at 1035 includes commanding, via the inverter, power draw to the motor in the first operating mode. Accordingly, when the air conditioning device draws power from the power supply device, a cumulative power draw (i.e., air conditioning device and the plurality of appliances) is less than the power limit, preventing circuit overload, such as depicted in FIG. 8B.

Figure 9A:
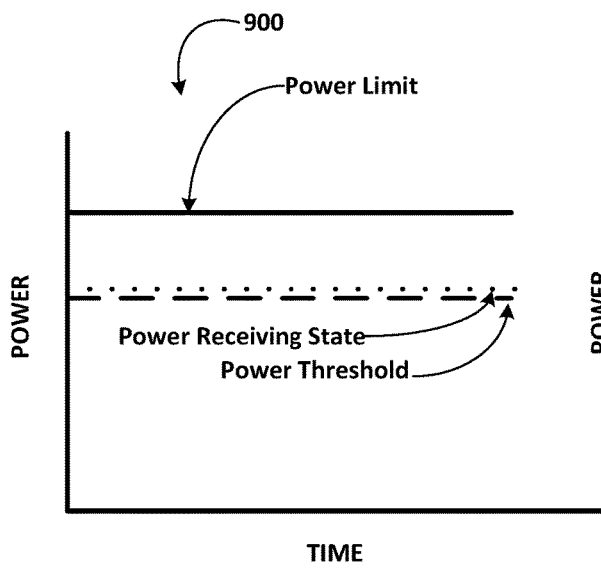
FIG. 9A provides a graph depicting an embodiment of a second operating mode in accordance with the method outlined in FIG. 7.
Figure 9B:
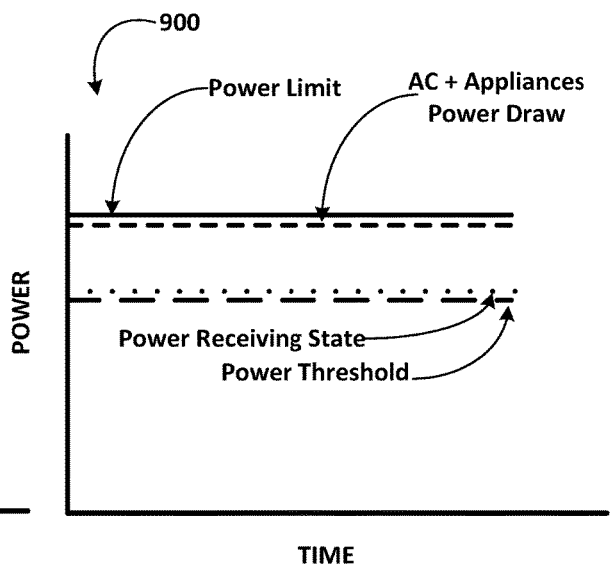
FIG. 9B provides a graph depicting an embodiment of a second operating mode in accordance with the method outlined in FIG. 7.

When the power receiving state is above the power threshold, such as depicted in FIG. 9A, method 1000 includes at 1036 generating a second operating mode signal indicative of switching the air conditioning device to the second operating mode. In a particular embodiment, the method 1000 includes at 1037 providing, via the inverter, power to the motor in the second operating mode. In still particular embodiments, method 1000 at 1037 includes commanding, via the inverter, power draw to the motor in the second operating mode. Accordingly, when the air conditioning device draws power from the power supply device, a cumulative power draw (i.e., air conditioning device and the plurality of appliances) is less than the power limit, preventing circuit overload, such as depicted in FIG. 9B.

It should be appreciated that graphs 800, 900 may depict switching between a first operating mode having a lower power setting, such as a lower amperage, and a second operating mode having a higher power setting, such as a higher amperage. Accordingly, when the plurality of appliances need to draw power, circuit overload can be avoided when activating the air conditioning device by switching the air conditioning device to the lower power setting. When less power is required at the plurality of appliances, or when a greater power supply is available, the air conditioning device may switch to the higher power setting.

Method 1000 may include embodiments in which power, power limit signal, power limit, power receiving state, etc. particularly include current, current limit signal, current limit, current receiving state, etc., respectively. Accordingly, embodiments of method 1000 may include one or more of steps obtaining a current limit signal; receiving a control command corresponding to providing current to the air conditioning device; determining, based on a current limit, whether to receive current at the air conditioning device in a first operating mode or a second operating mode; providing current or commanding current draw from a current supply device to an inverter; switching, via the inverter, an amount or magnitude of current provided to a motor based on the first operating mode and the second operating mode; monitoring a current receiving state of a plurality of appliances; switching between the first operating mode and the second operating mode based on the current receiving state of the plurality of appliances; providing, via the inverter, current to the motor in the first operating mode; or providing, via the inverter, current to the motor in the second operating mode. Current-limiting embodiments of method 1000 may further include varying AC voltage or power factor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioning system for a recreation vehicle, the air conditioning system comprising:
    an inverter operably coupled to a motor, the inverter configured to provide power to the motor in a first operating mode or a second operating mode, the motor operably coupled to a compressor; and
    a controller in operable communication with the air conditioning device, the controller configured to:
        obtain a power limit signal;
        receive a control command corresponding to providing power to the air conditioning device;
        determine, based on a power limit, whether to receive power at the air conditioning device in the first operating mode or the second operating mode;
        monitor a power receiving state of a plurality of appliances; and
        switch between the first operating mode and the second operating mode based on the power receiving state of the plurality of appliances.

2. The air conditioning system of claim 1, the controller configured to:
    command power draw from a power supply device; and
    switch, via the inverter, an amount of power provided to the motor based on the first operating mode and the second operating mode.

3. The air conditioning system of claim 1, wherein the compressor is a variable speed compressor.

4. The air conditioning system of claim 1, the controller configured to:
    determine whether the plurality of appliances is in the power receiving state below a power threshold or above the power threshold.

5. The air conditioning system of claim 4, the controller configured to:
    generate a first operating mode signal indicative of switching the air conditioning device to the first operating mode.

6. The air conditioning system of claim 5, the controller configured to:
    command, via the inverter, power draw to the motor in the first operating mode.

7. The air conditioning system of claim 5, the controller configured to:
    generate a second operating mode signal indicative of switching the air conditioning device to the second operating mode.

8. The air conditioning system of claim 7, the controller configured to:
    command, via the inverter, power draw to the motor in the second operating mode.

9. The air conditioning system of claim 1, wherein the controller comprises a thermostat operably coupled to the air conditioning device.

10. A method for operating an air conditioning device at a recreation vehicle, the method comprising:
    obtaining a power limit signal;
    receiving a control command corresponding to providing power to the air conditioning device;

determining, based on a power limit, whether to receive power at the air conditioning device in a first operating mode or a second operating mode;

monitoring a power receiving state of a plurality of appliances, wherein the plurality of appliances and the air conditioning device are operably coupled to a power supply device to receive power from the power supply device;

determining whether the plurality of appliances is in the power receiving state below a power threshold or above the power threshold;

switching, via an inverter, between the first operating mode and the second operating mode based on the power receiving state of the plurality of appliances;

generating a first operating mode signal indicative of switching the air conditioning device to the first operating mode;

providing, via the inverter, power to a motor operably coupled to a variable speed compressor of the air conditioning device in the first operating mode;

generating a second operating mode signal indicative of switching the air conditioning device to the second operating mode; and providing, via the inverter, power to the motor in the second operating mode.

11. A computer-readable medium configured to store instructions that, when executed by a computing device, cause the computing device to perform operations, the operations comprising:

obtaining a power limit signal;

receiving a control command corresponding to providing power to an air conditioning device; and determining, based on a power limit, whether to receive power at the air conditioning device in the first operating mode or the second operating mode;

monitoring a power receiving state of a plurality of appliances; and commanding switching between the first operating mode and the second operating mode based on the power receiving state of the plurality of appliances.

* * * * *